United States Patent
Bramante et al.

(10) Patent No.: US 11,297,805 B2
(45) Date of Patent: Apr. 12, 2022

(54) MITICIDAL BEEHIVE ENTRANCEWAY

(71) Applicants: Andrew Bramante, Fairfield, CT (US); Raina Jain, Riverside, CT (US)

(72) Inventors: Andrew Bramante, Fairfield, CT (US); Raina Jain, Riverside, CT (US)

(*) Notice: Subject to any disclaimer, the term of this patent is extended or adjusted under 35 U.S.C. 154(b) by 91 days.

(21) Appl. No.: 16/862,824

(22) Filed: Apr. 30, 2020

(65) Prior Publication Data

US 2020/0390069 A1    Dec. 17, 2020

Related U.S. Application Data

(60) Provisional application No. 62/842,205, filed on May 2, 2019.

(51) Int. Cl.
| | |
|---|---|
| *A01K 51/00* | (2006.01) |
| *A01N 25/34* | (2006.01) |
| *A01N 31/08* | (2006.01) |
| *A01K 47/06* | (2006.01) |

(52) U.S. Cl.
CPC .............. *A01K 51/00* (2013.01); *A01K 47/06* (2013.01); *A01N 25/34* (2013.01); *A01N 31/08* (2013.01)

(58) Field of Classification Search
CPC ................................ A01K 47/06; A01K 51/00
USPC ......................................... 449/20, 22, 24, 25
See application file for complete search history.

(56) References Cited

U.S. PATENT DOCUMENTS

| | | | | | |
|---|---|---|---|---|---|
| 36,169 | A | * | 8/1862 | Reid | A01K 47/06 449/22 |
| 90,203 | A | * | 5/1869 | Starbuck | A01K 47/06 449/25 |
| 3,069,702 | A | * | 12/1962 | Reed | A01K 47/06 449/19 |
| 3,200,419 | A | * | 8/1965 | Root | A01K 47/06 449/2 |
| 3,350,728 | A | * | 11/1967 | Root | A01K 47/06 449/19 |
| 4,517,694 | A | * | 5/1985 | Hong | A01K 47/06 449/19 |
| 4,965,287 | A | * | 10/1990 | Stendel | A01K 51/00 514/531 |
| 5,348,511 | A | * | 9/1994 | Gross | A01K 47/06 449/2 |

(Continued)

FOREIGN PATENT DOCUMENTS

| | | | | |
|---|---|---|---|---|
| EP | 3132680 A1 | * | 2/2017 | ............. A01K 51/00 |
| FR | 2908960 A1 | * | 5/2008 | ............. A01K 47/06 |

(Continued)

*Primary Examiner* — Lisa L Tsang
(74) *Attorney, Agent, or Firm* — McCormick, Paulding & Huber PLLC

(57) ABSTRACT

A miticidal beehive entranceway is provided having a solid substrate coated with a thymol-containing composition and having holes dimensioned to compel bees entering/exiting the beehive to walk through the holes and contact the thymol-containing composition, thereby exposing mites attached to the bee to a killing dose of thymol while not injuring the bee. In some embodiments, the entranceway may have agitating bristles (which may be coated with thymol) extending into the entranceway, which contact the body of the bee to agitate or dislodge the mites attached to the bee, further enhancing mite removal or death.

13 Claims, 20 Drawing Sheets

FIG. 29

(56) References Cited

U.S. PATENT DOCUMENTS

| | | | |
|---|---|---|---|
| 7,556,552 B1 * | 7/2009 | Kemp | A01K 47/06 449/1 |
| 9,357,752 B2 * | 6/2016 | Collinson et al. | A01G 7/06 |
| 9,510,590 B2 | 12/2016 | Storm et al. | |
| 2003/0216483 A1 * | 11/2003 | Hermann | C11D 17/042 521/50 |
| 2005/0014449 A1 * | 1/2005 | Pascual | A01N 65/22 449/3 |
| 2007/0059333 A1 * | 3/2007 | Volby | A61P 33/14 424/410 |
| 2008/0280528 A1 * | 11/2008 | Mudd | A01K 51/00 449/2 |
| 2012/0077412 A1 * | 3/2012 | Put | A01K 47/06 449/20 |
| 2016/0278369 A1 | 9/2016 | Krieger et al. | |
| 2019/0082660 A1 * | 3/2019 | Ragsdale | A01K 47/06 |

FOREIGN PATENT DOCUMENTS

| | | | | |
|---|---|---|---|---|
| KR | 20170130701 A | * | 11/2017 | |
| KR | 20180104365 A | * | 9/2018 | |
| WO | WO-0223981 A1 | * | 3/2002 | A01K 51/00 |
| WO | WO-2018098589 A1 | * | 6/2018 | A01K 51/00 |

* cited by examiner

- Injection Volume: 3µl liquid injection
- Flow Rate of He Carrier: 2ml/min
- Injector Temperature: 260°C
- FID Detector Temperature: 300°C
- Oven Temperature: 50°C,
- hold for 1min, ramp to 110°C at 4.5°C/min; hold for 2 min
- Split Ratio: 10:1
- Column: Supelco Equity-1 30m x 0.25 mm, 0.25µm film Dual-function Thymol emitting Hive Entranceway Dual function entrance composed of Thymol-in-Hydromed-D

MITICIDAL BEEHIVE ENTRANCEWAY

CROSS REFERENCE TO RELATED APPLICATION

This application claims priority from provisional U.S. patent application 62/842,205, filed May 2, 2019, which is incorporated herein by reference in its entirety for all purposes.

FIELD OF THE INVENTION

The present invention relates to an apparatus and method for combatting infestation of honey bees by *Varroa* mites, including *Varroa destructor*.

BACKGROUND OF THE INVENTION

The following information is provided to aid the reader in understanding the invention and is not admitted to constitute prior art.

Bees are a crucial pollinator of over 80% of agricultural crops and also an economically important producer of commodities that find diverse uses in the food and medicine industry. Additionally, bees pollinate over 90% of wild plants, and more than $15 billion a year in U.S crops are pollinated just by bees. However, bees made the endangered species list in 2017 and are declining at an alarming rate. Researchers estimate that nearly one-third of all honey bee colonies in the United States have vanished, and the number of colonies is now at its lowest point in the past 50 years. At present, the *Varroa* mite is viewed as the single greatest threat to the honey bee population worldwide. The *Varroa* mite is a parasitic mite that feeds on the fat bodies of developing honey bee larvae and adult bees (as shown in FIG. 1), while aggressively reproducing within an infected bee colony. Most recent research highlights the mite's feeding on fat bodies within the bee. Honey bee fat bodies are responsible for many Important functions; amongst them, they: (i) produce antioxidants to help manage their immune system, (ii) regulate the timing and activity of hormones, (iii) produce the wax that covers parts of the bees' exoskeleton, keeping water in and diseases out, and (iv) provide the bee with resistance to pesticides. As such, *Varroa* mite removal of bee fat body negates all of these critical functions, contributing to Colony Collapse Disorder. Further, *Varroa* mites transmit viral diseases such as Kashmir Bee Virus and Deformed Wing Virus that causes severe damage to colonies and weakens the bees, often leading to their death. Currently, there is no simple, long-lasting, and reliable treatment for fighting the *Varroa* mite. To combat this issue, a reliable and effective treatment is needed, that would consistently remove and kill mites from bees as they enter the hive.

Currently available methods for combatting *Varroa* mite infestation are not as reliable or effective as desired and are inconvenient to use. For example, thymol (a commercially available derivative of the Thyme plant) has been used in several ways for control of *Varroa* mites. Thymol acts by its vapors, which must be sufficiently concentrated to kill the mites but not so concentrated as to harm the bees. The therapeutic window is between 5-15 microgram/liter of hive air. Thymol compositions are sold commercially under the marks Apiguard, ApiLifeVar, and Thymovar. Apiguard is a thymol-containing gel, while the other two products are strips saturated with thymol. ApiLifeVar contains (in addition to thymol) eucalyptol, menthol, and camphor, while the other two products contain only thymol. All products require the beekeeper to open the hive and place (or replace) the product inside. Since the products function by releasing thymol vapor into the hive, proper placement of the product and the temperature in the hive are important variables for the beekeeper to consider. In particular, temperature is a critical consideration in the use of commercially-available thymol products. While all products were generally effective in southern climates, tests in northern climates (northern Italy, Germany) showed the products were less effective and worked more slowly. Thus, a temperature-independent thymol varroacide would be highly desirable.

SUMMARY OF THE INVENTION

The present invention is an improved apparatus and method for combatting *Varroa* infestation of honeybee hives.

The apparatus is an entranceway (or passageway) for a beehive that covers the entire entry/exit to the beehive and comprises a solid substrate having a thymol-containing coating and holes through which the bees must walk to enter/exit the beehive.

The substrate has an outward-facing side (away from the beehive entrance) and an inward-facing side (toward the beehive entrance) and a plurality of holes from the outward-facing side to the inward-facing side dimensioned to prevent bees from entering the bee hive while flying but requiring them to walk through the holes to gain entry to the hive. The holes are large enough to permit a bee to walk through them but not so large as to permit a bee to fly through them and are typically about 9 mm in diameter, although other hole diameters would be possible. The solid substrate may be made from any material that is compatible with the thymol-containing coating material and does not decompose under use. Conveniently, the substrate may be 3D printed using a compatible polymer such as acrylonitrile butadiene styrene (ABS), although other 3D printer compatible polymers may be used. The substrate may also be made in other ways and of other materials, as will be understood in the art. The dimensions of the substrate may be 20×20×150 mm, which will conveniently fit into the entry of a normal beehive, but the height and width of the entranceway may be adjusted as appropriate to the beehive to which the entranceway is to be applied so as to completely cover the entrance. The depth of the entranceway (the distance from the outward-facing side to the inward-facing side that is the length of the holes through which the bees pass to enter the beehive) should be sufficient to provide the bees with sufficient thymol to achieve the $LD_{50}$ for the *Varroa* mites over a relatively short period of time while not achieving the $LD_{50}$ for bees. As further described below, the present inventors have found that a depth of 20 mm yields the desired steady state concentration of thymol on the bees after four days of use.

The thymol-containing composition is a mixture of a carrier and thymol. While the composition may comprise other active ingredients besides thymol, it preferably consists of thymol and the carrier (plus any residual solvent). The carrier is conveniently a thymol-compatible polymer such as a hydrophilic urethane, which is soluble in a solvent which also dissolves thymol. To apply the coating to the substrate, appropriate amounts of the carrier and thymol are dissolved in the solvent to form a coating solution that is applied to the substrate. The coating solution may be applied to the substrate by pouring it onto the substrate, dipping the substrate into the coating solution, or by any other known technique.

Conveniently, the coating solution comprises thymol, a hydrophilic urethane, and ethanol as the solvent. Preferably, the coating solution consists of thymol, a hydrophilic urethane and ethanol. One preferred solution is formed by dissolving a 50:50 wt/wt mixture of thymol and hydrophilic urethane in sufficient ethanol to dissolve the two materials. For example, 15 g of thymol and 15 g of hydrophilic urethane may be dissolved in about 500 ml of ethanol. A preferred hydrophilic urethane is Hydromed D, supplied by Advansource Biomaterials.

The entranceway may optionally also comprise a formic acid-infused strip on the floor of the entry just inside the inward-facing side of the entranceway, so that living *Varroa* mites that fall off the entering bees are killed.

In another embodiment of the entranceway, it may comprise a plurality of agitation bristles (preferably thymol-coated) projecting into each entry hole of the entranceway and dimensioned so as to agitate or dislodge *Varroa* mites located within the abdominal plates along the bee's exoskeleton and improve treatment of the mites. Although the agitation bristles may be located anywhere along the depth of the holes in the entranceway, they are conveniently located on the outward-facing side of the entranceway so the bees entering the hive contact the agitation bristles as they are entering the entry holes of the entranceway.

In use, the entranceway is placed in the entry of the hive so as to compel entering bees to pass through its holes and contact the thymol-containing coating and optionally the agitation bristles in the embodiment with bristles.

The invention comprises the entranceway described herein, a beehive having the entranceway, and a method of combatting *Varroa* infestation of honeybees that comprises placing the entranceway described herein in the entrance of a beehive.

The entranceway functions by two mechanisms. Thymol is administered directly to bees when they pass through the entranceway to enter the hive. Thymol vapor is also outgassed from the coating into the headspace of the hive. This dual action is an important aspect of the invention. Surprisingly, the inventors have found that the outgassing of thymol from the entranceway into the headspace of the hive is not affected by temperature, contrary to the teachings of the art that thymol-containing compositions lose efficacy at lower temperatures. The thymol-coated entranceway releases identical amounts of thymol at temperatures ranging from 2° C. to 40° C. Thus, the release of thymol from the thymol-coated entranceway surpasses that of the most widely-used commercial thymol varroacide and is effective at temperatures throughout the practical range of use.

The entranceway is easily replaceable when needed without opening the hive or disturbing the bees. The particular embodiment of the invention described below is expected to have a useful life of about one month.

DETAILED DESCRIPTION OF THE INVENTION

Figure 1:
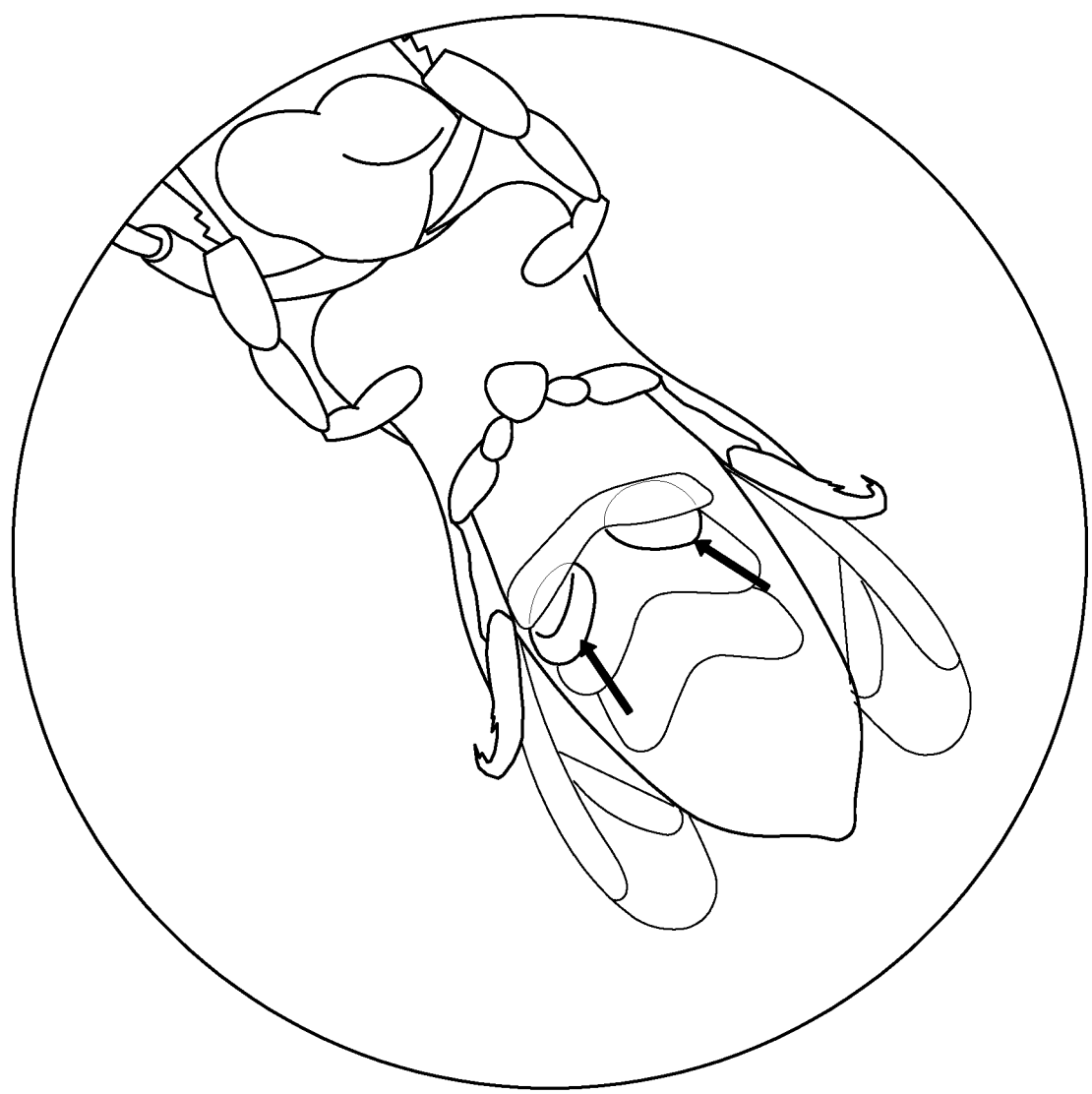
FIG. 1 depicts a *Varroa destructor* mite feeding on the abdomen of a honey bee.

The present invention provides a thymol-coated entranceway to a beehive containing holes that allow the bees to walk through, consistently releasing the thymol varroacide over prolonged periods in two ways:

thymol will be released onto passing bees, causing the Varroa mites to disengage from the bee abdomen as they enter/exit the hive.

thymol will be consistently released as a gas into the headspace of the hive, enabling automatic and continued control of the Varroa mite population, particularly on honey bee larvae.

Using this dual-function mechanism, the new entranceway will administer thymol varroacide directly to mite by physical contact, kill those live mites that fall off of bees at the entranceway with an optional formic acid strip, and protect both mature and larvae stage bees through thymol outgassing. To agitate and/or promote dislodging of mites located within the abdominal plates of the bee's exoskeleton, the entranceway may optionally have agitation bristles projecting into the entranceway holes, as described further below.

An entranceway for a beehive is provided which comprises a solid substrate, said substrate dimensioned to completely occlude (or block) the entrance of the beehive and comprising a plurality of entry holes dimensioned to allow entry/exit of the bees into (or out of) the hive only when walking, and said substrate being coated with a thymol-containing composition, whereby bees entering or exiting the hive are compelled to pass through the entry holes and contact the thymol-containing composition.

The solid substrate may be any solid compatible with thymol and resistant to deterioration in use. Conveniently, the substrate is made from a 3D compatible polymer, such as ABS.

The substrate has an outward-facing side (away from the beehive entrance) and an inward-facing side (toward the beehive entrance) and a plurality of holes from the outward-facing side to the inward-facing side dimensioned to prevent bees from entering the bee hive while flying but requiring them to walk through the holes to gain entry to the hive. The holes are large enough to permit a bee to walk through them but not so large as to permit a bee to fly through them and are typically about 9 mm in diameter, although other hole diameters would be possible. The solid substrate may be made from any material that is compatible with the thymol-containing coating material and does not decompose under use. Conveniently, the substrate may be 3D printed using a compatible polymer such as ABS, although other 3D printer compatible polymers may be used. The substrate may also be made in other ways and of other materials, as will be understood in the art. The dimensions of the substrate may be 20×20×150 mm, which will conveniently fit into the entry of a normal beehive, but the height and width of the entranceway may be adjusted as appropriate to the beehive to which the entranceway is to be applied so as to completely occlude the entrance. The depth of the entranceway (the distance from the outward-facing side to the inward-facing side that contains the holes through which the bees pass to enter the beehive) should be sufficient to provide the bees with sufficient thymol to achieve the $LD_{50}$ for the Varroa mites over a relatively short period of time, while remaining below the $LD_{50}$ for bees, where $LD_{50}$ is the lethal dose of 50% of the organisms (or LC50 lethal concentration for 50% of the organisms). As further described below, the present inventors have found that a depth of 20 mm yields the desired steady state concentration of thymol on the bees after four days of use.

The thymol-containing composition is a mixture of a carrier and thymol. While the composition may comprise other active ingredients besides thymol, it preferably consists of thymol and the carrier (plus any residual solvent). The carrier is conveniently a thymol-compatible polymer such as a hydrophilic urethane, which is soluble in a solvent which also dissolves thymol. To apply the coating to the substrate, appropriate amounts of the carrier and thymol are dissolved in the solvent to form a coating solution that is applied to the substrate. The coating solution may be applied to the substrate by pouring it onto the substrate, dipping the substrate into the coating solution, or by any other known technique.

Conveniently, the coating solution comprises thymol, a hydrophilic urethane, and ethanol as the solvent. Preferably, the coating solution consists of thymol, a hydrophilic urethane and ethanol. One preferred solution is formed by dissolving a 50:50 wt/wt mixture of thymol and hydrophilic urethane in sufficient ethanol to dissolve the two materials. For example, 15 g of thymol and 15 g of hydrophilic urethane may be dissolved in about 500 ml of ethanol. A preferred hydrophilic urethane is Hydromed D, supplied by Advansource Biomaterials.

The entranceway may optionally also comprise a formic acid-infused strip just inside the inward-facing side of the substrate, so that Varroa mites that fall off the entering bees but are not yet dead will be killed.

SEM Analysis of a Recently Feeding Varroa Mite

To better understand the mechanism with which Varroa mites latch onto the abdomen, and feed off of the inner contents of the honey bee, live Italian honey bees (Apis mellifera ligustica), with attached Varroa mites, were isolated from a local bee hive. A single mite was removed, and frozen with liquid-$N_2$, to freeze the biological condition immediately prior to its sacrifice, for spectral and microscopic analysis of the abdominal region.

Figure 2:
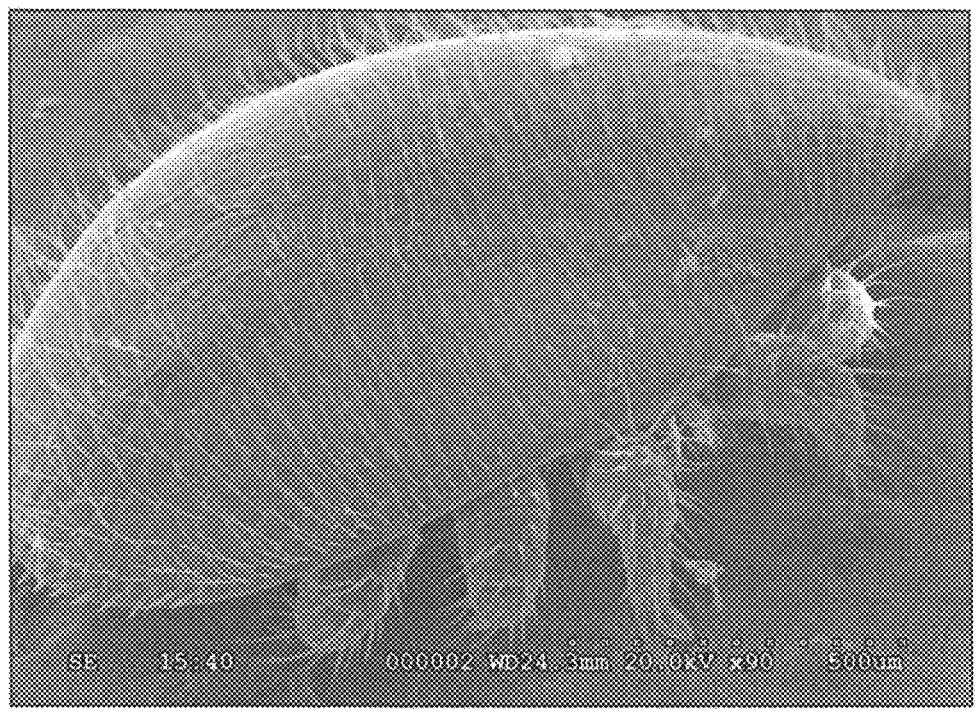
FIG. 2 depicts a top SEM view of the *Varroa destructor*, taken at 20.0 eV with ×90 magnification.
Figure 3:
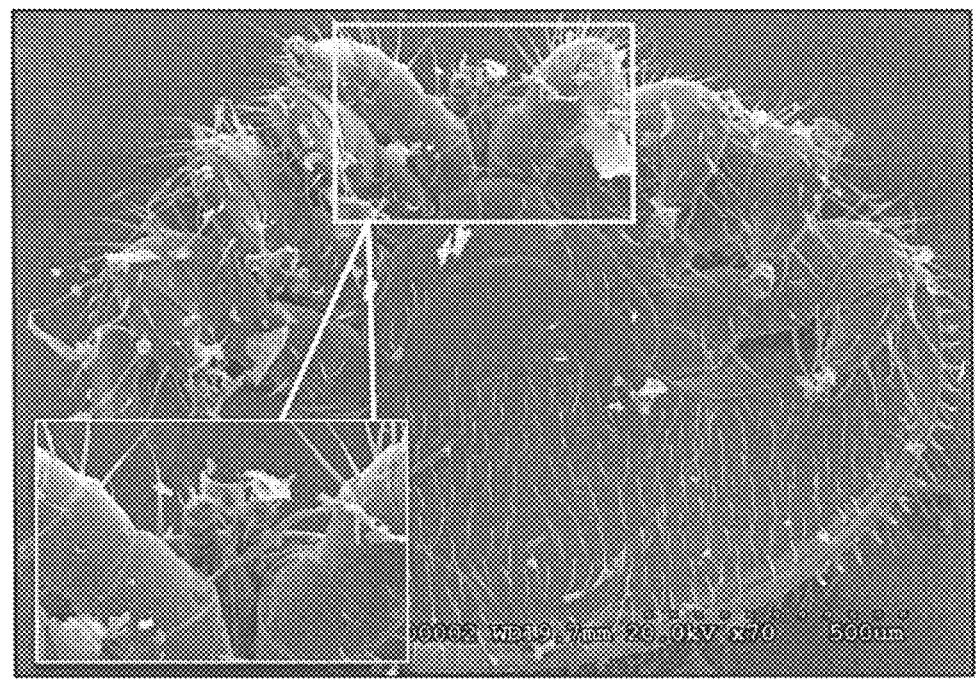
FIG. 3 depicts a bottom SEM view of the *Varroa destructor*, taken at 20.0 eV with ×90 magnification.

Two feeding Varroa mites were placed onto an SEM stage, and sputter coated, prior to SEM analysis. The SEM images (FIGS. 2-3) highlight the appearance of the Varroa destructor from top and bottom views, with special attention paid to the feeding mechanism of the mite, in which the fat-body content of the bee is drawn.

Analytical Evidence of Honey Bee Fat Body Depletion

Figure 4:
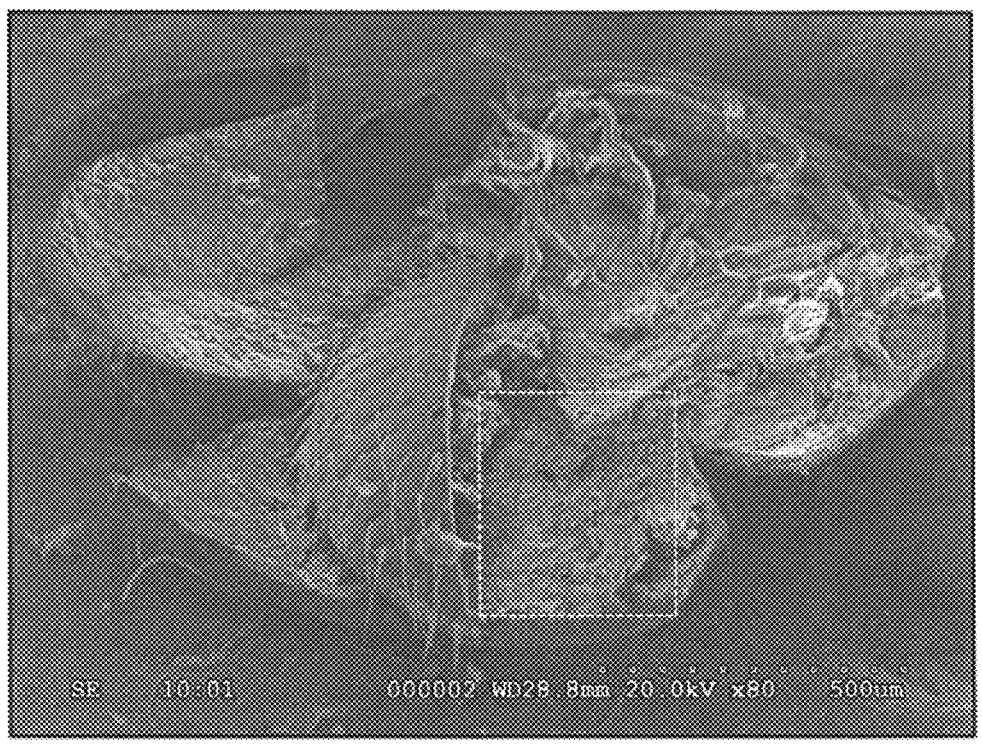
FIG. 4 depicts an SEM analysis of a *Varroa destructor* mite cut diagonally to reveal inner contents, assumed to be honey bee fat body.
Figure 5:
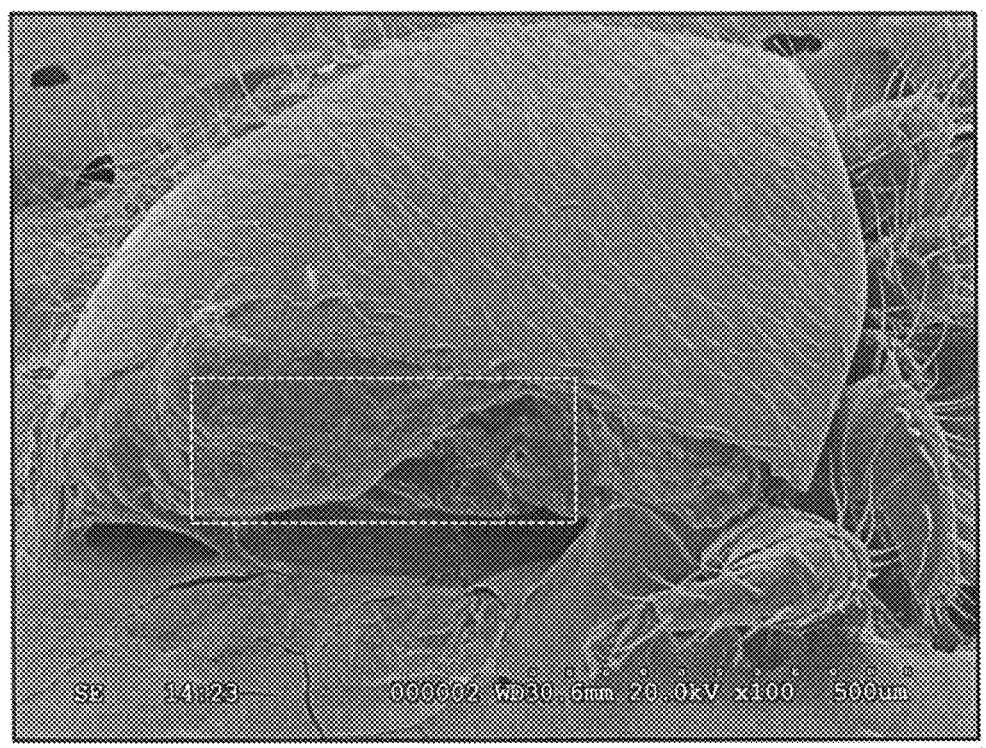
FIG. 5 depicts an SEM analysis of a *Varroa destructor* mite cut diagonally to reveal inner contents, assumed to be honey bee fat body.

To evaluate what was within the Varroa mite at the time of feeding (and subsequent liquid nitrogen freezing), an enlarged mite was placed atop an SEM stub, cut in half diagonally, and sputter coated for SEM analysis (FIGS. 4-5). The SEM images highlight the inner contents of the Varroa mite, which contain the fat bodies from the honey bee.

Figure 6:
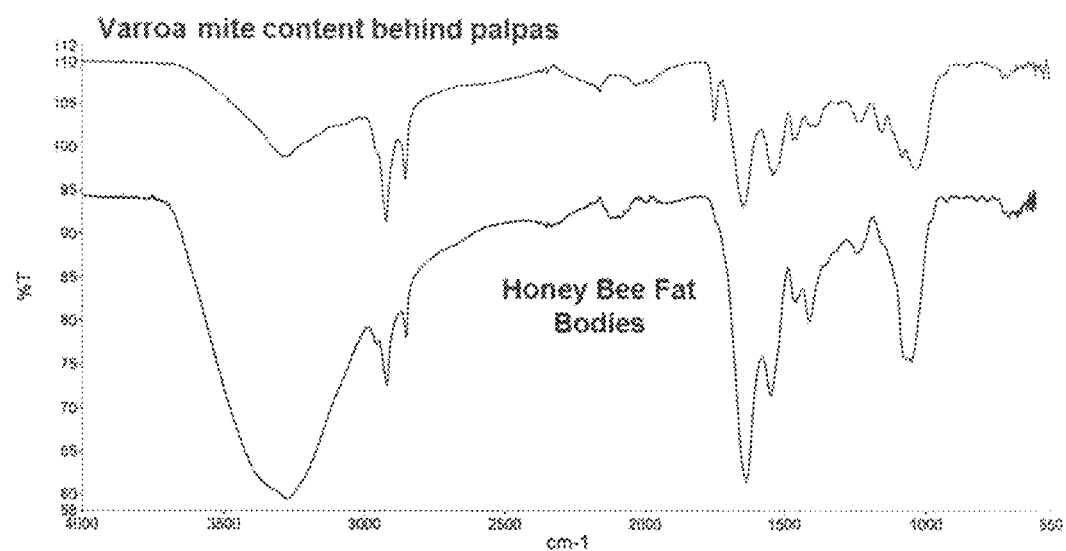
FIG. 6 shows an FTIR-ATR analysis of the inner contents of a *Varroa destructor* mite (upper spectra) compared to honey bee fat body (lower spectra).

FTIR analysis of the mite internal contents, immediately behind the mite palpas, versus the fat bodies of a freshly sacrificed honey bee, was conducted (FIG. 6). Close similarity of the spectra further support fat body flow from the bee abdomen to the parasite, providing analytical evidence for Varroa mite depletion of honey bee fat body.

GC-FID Detection of Thymol

Figures 7, 8:
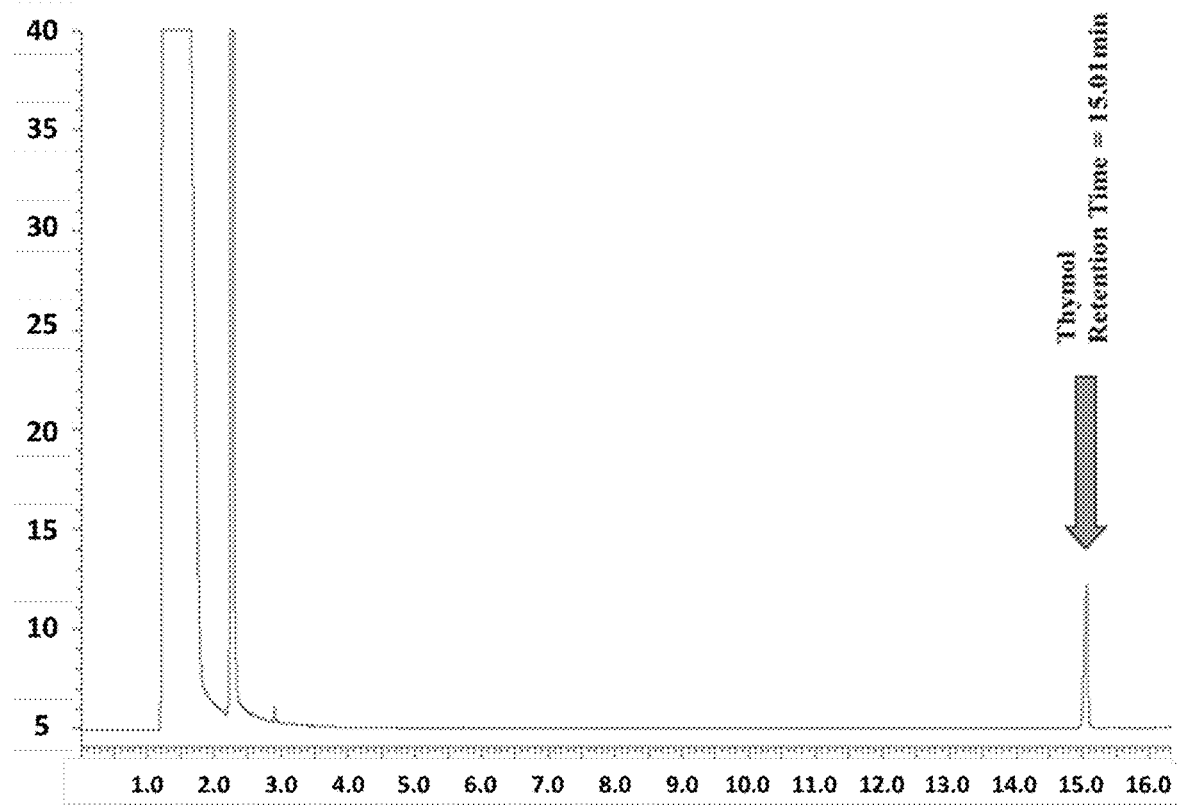
FIG. 7 shows the GC-FID parameters used to obtain thymol peak at 15.1 minutes.
FIG. 8 shows a gas chromatograph of thymol in ethanol highlighting a retention time for thymol of 15.1 minutes.
Figure 9:
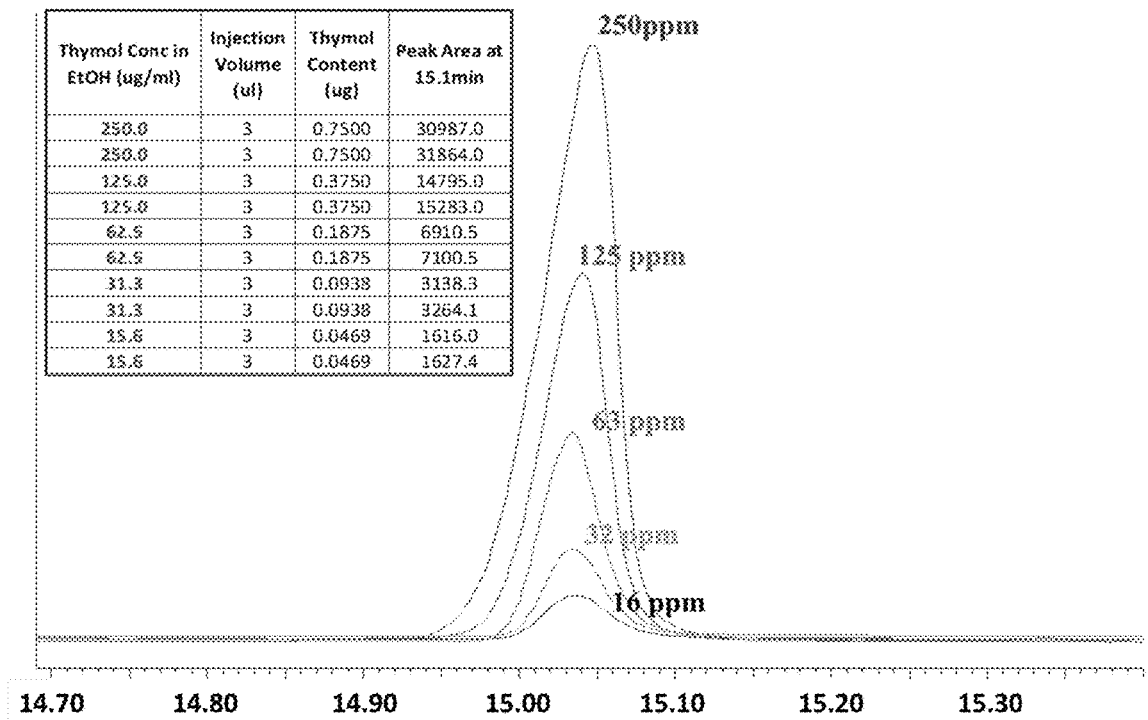
FIG. 9 shows a gas chromatograph of serial dilutions of thymol in ethanol.
Figure 10:
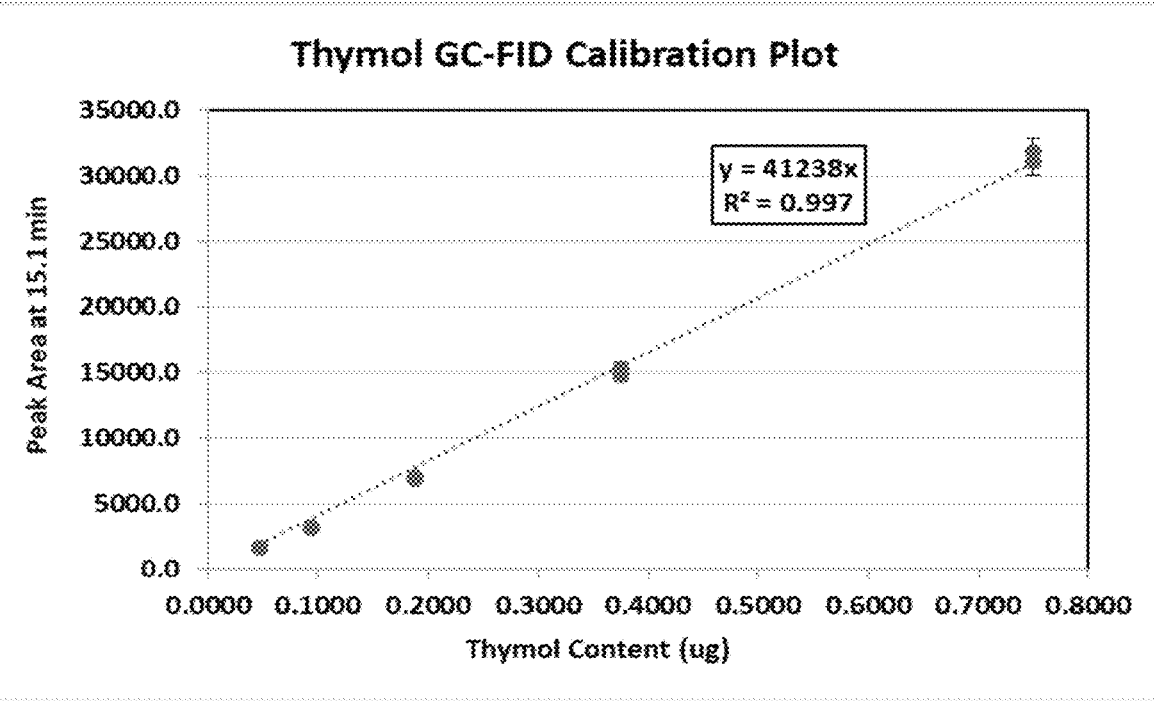
FIG. 10 shows a GC calibration plot of thymol content.

To determine both physical deposition of embedded thymol (within the beehive entranceway), and outgassing of the same varroacide into the beehive, a Gas Chromatographic method was created, using a PerkinElmer Autosystem XL Gas Chromatogram, with Flame Ionization Detection (GC-FID). Using the conditions listed in FIG. 7, thymol was found to elute at a retention time of 15.1 minutes (FIG. 8). To quantitate the amount of thymol released, both as solid (as the bee passes through the entranceway hole), and as a gas (from entranceway outgassing into the hive), serial, standard dilutions of 250 ppm thymol in ethanol were created, and their gas chromatograms obtained (FIG. 9). Peak area at 15.1 min for thymol is plotted against concentration, to create calibration plot for thymol content (in µg, FIG. 10).

Creation of the Dual-Function Entranceway

Hydromed-D (Advansource Biomaterials) is an ether-based hydrophilic urethane with excellent adhesive and cohesive properties. It is soluble in most organic solvents, and does not require UV curing in order to harden into a solid. Thymol is soluble in ethanol, as is Hydromed-D, which will allow for straightforward mixing of thymol in Hydromed, so that the 50:50 mixture can be used to coat a (previously) 3D-printed beehive entranceway.

Figure 11:
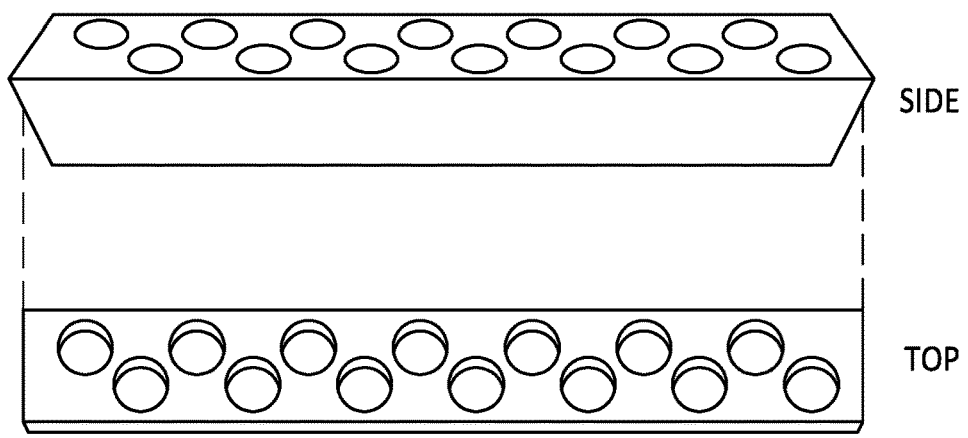
FIG. 11 shows the three-dimensional model of the entranceway.
Figure 12:
FIG. 12 shows the 3-D printed ABS entranceway before coating with thymol.
Figure 13A:
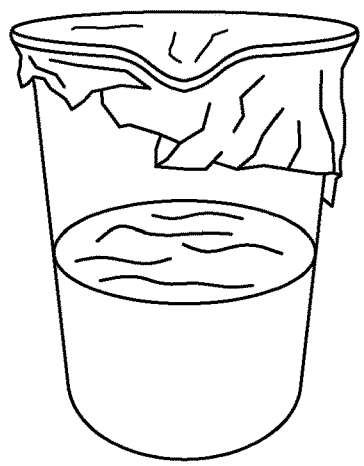
FIG. 13A shows the thymol/Hydromed coating solution for coating the entranceway and FIG. 13B shows the coated entranceway.
Figure 13B:
Figure 14A:
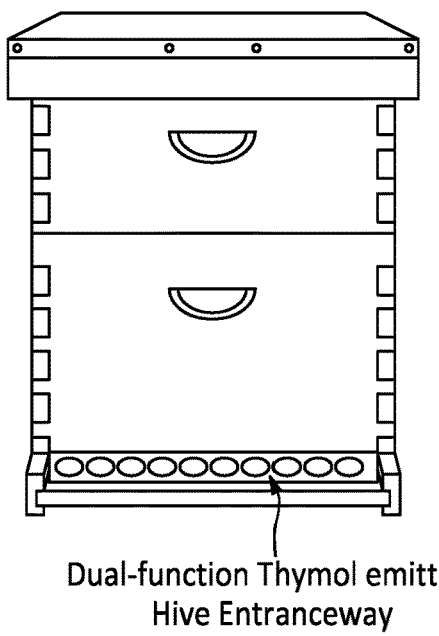
FIG. 14A shows a cartoon of the entranceway in a beehive.
Figure 14B:
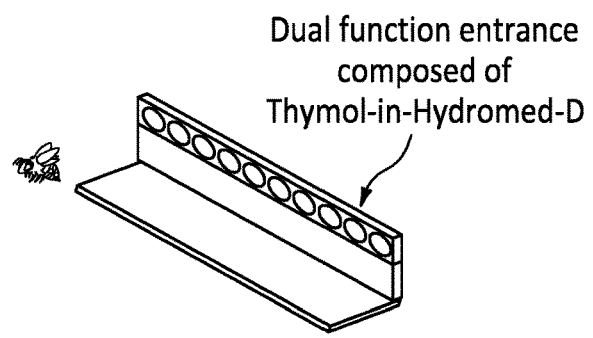
FIG. 14B shows a detail of the entranceway.
Figure 14C:
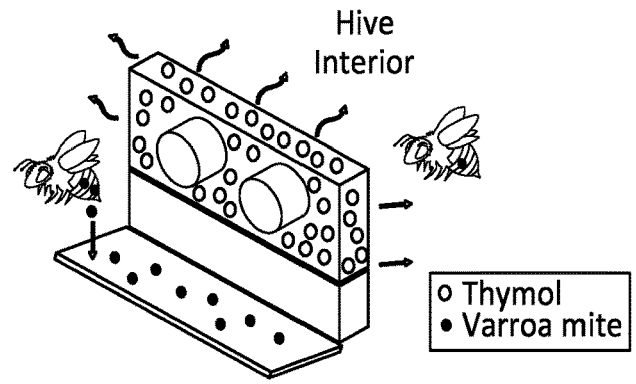
FIG. 14C shows bees passing through the entranceway.
Figure 15:
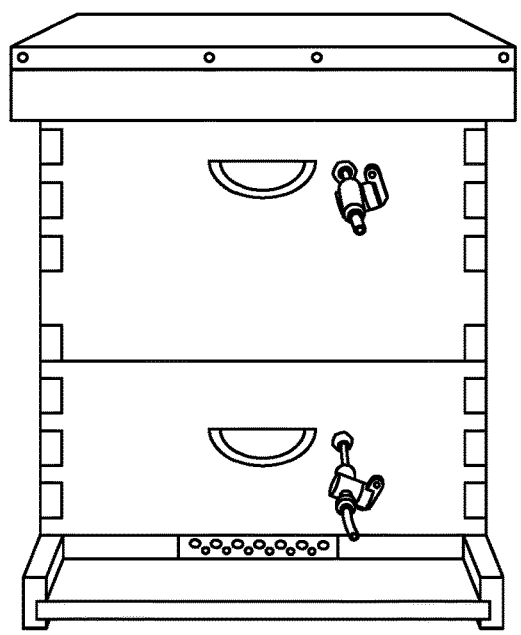
FIG. 15 is a picture of a beehive equipped with the coated entranceway.

To create the entranceway, a custom 3-D print design was developed in Tinkercad, and printed using ABS plastic. The printed ABS entranceway is 20×20×150 mm in dimension, with 13 alternating 9 mm circular holes from the outward-facing side to the inward-facing side through which the honeybees would pass (FIGS. 11-12). To create the finished, dual-function, thymol-emitting entranceway, a 50:50 mixture of thymol and Hydromed-D (15 g each) was dissolved in ~500 ml reagent grade ethanol, and magnetically stirred for 12 hours under a fume hood FIG. 13A. This viscous solution was then poured onto the previously-created ABS entranceway form on top of a sheet of aluminum foil, and allowed to harden for 24 hours to form the completed entranceway device FIG. 13B. After hardening, a typical dual-function, thymol-emitting entranceway contains ~1.6 grams of active 50:50 (% m/m) thymol/Hydromed-D coating.

Installation and Detection of Entranceway Outgas of Thymol

The dual-function, thymol-emitting entranceway (DF-TE) is placed at the front of and occluding the otherwise rectangular entrance. The entranceway is placed so as to require the bees to pass through the holes in order to enter/exit the beehive. As bees enter or leave the hive, thymol from the DF-TE is deposited onto the bee upon physical contact. As the foraging bees enter/leave the hive under normal conditions, the thymol content on the bee will reach 56 µg (the $LC_{50}$ of thymol for *Varroa* mites) leading to the parasite's release from the bee, and death (FIGS. 14A, 14B, 14C and FIG. 15).

Serving as dual-function, the entranceway also releases thymol vapor into the hive, creating an environment that is hostile for the *Varroa* mite. This outgassing of thymol vapor will control the *Varroa* mite population within the hive, for those parasites lodged within the hive, or attached to larvae.

Dual-Function Thymol Emitting Entranceway Release of Thymol Gas into a Bee Hive

Figure 16:
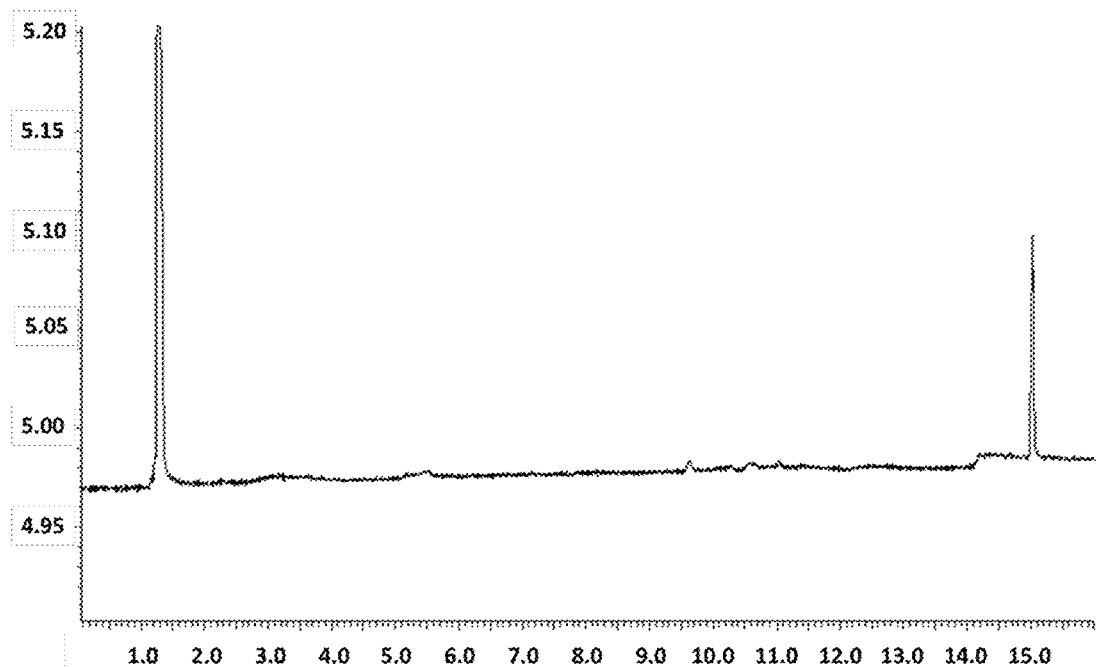
FIG. 16 is a GC-FID analysis of thymol release in a 1.2 l bag.
Figure 17:
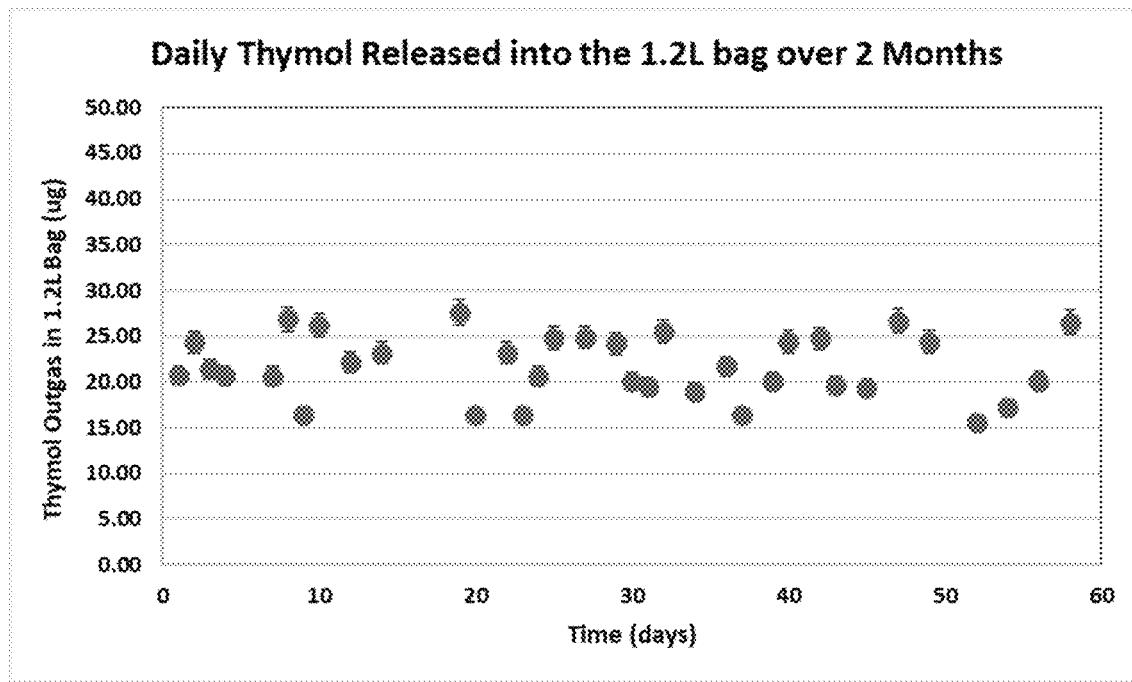
FIG. 17 depicts thymol release from a 1.2 l bag over a period of two months.
Figure 18:
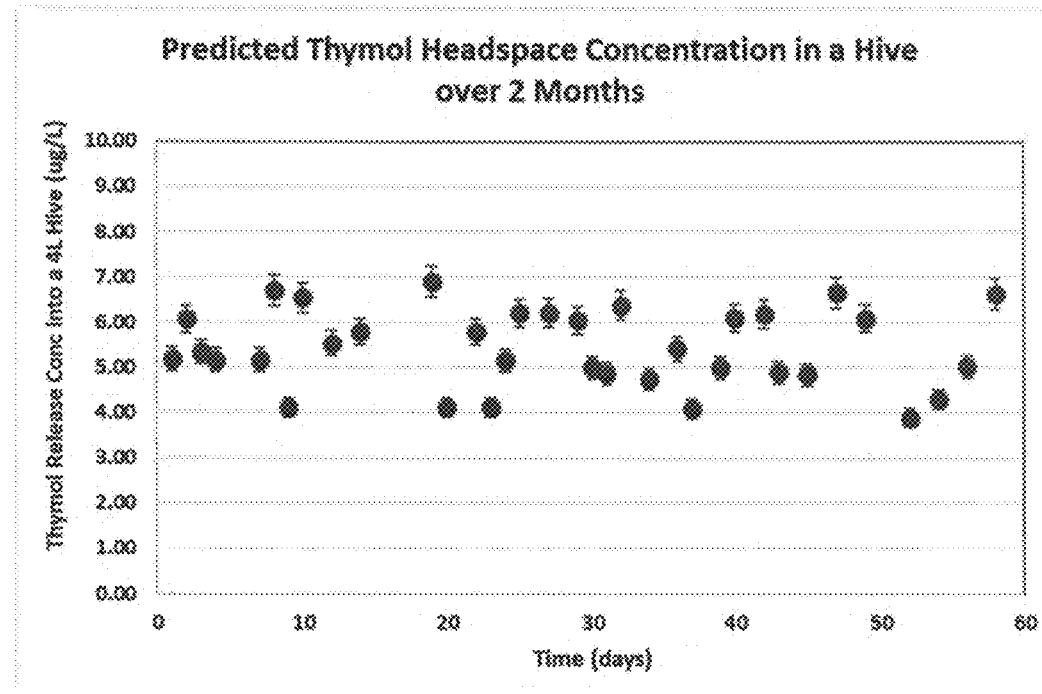
FIG. 18 depicts the predicted thymol headspace concentration in a typical beehive over a period of two months.
Figure 19:
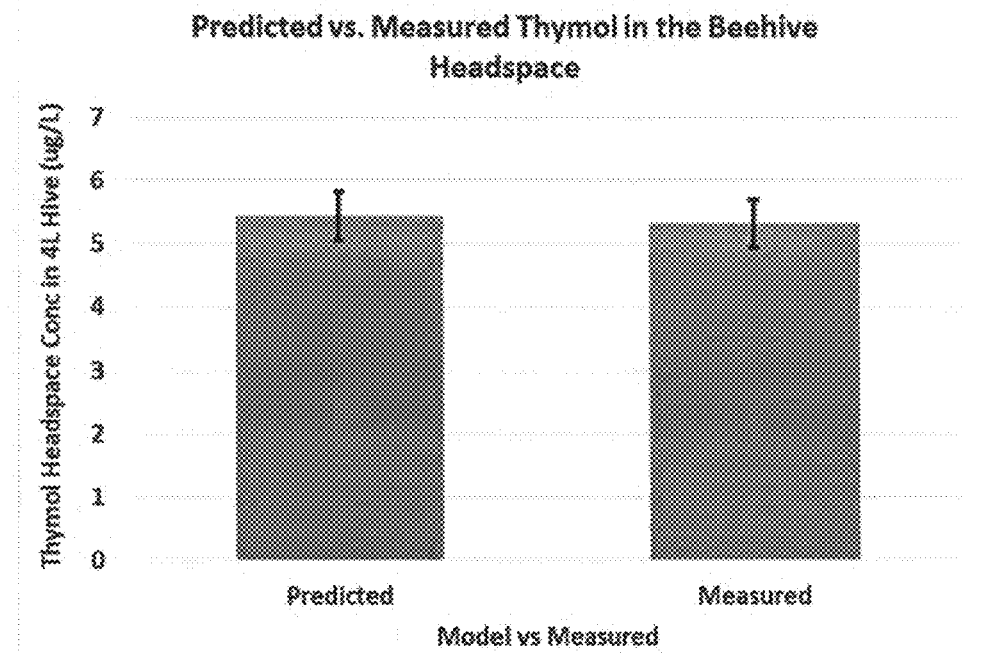
FIG. 19 shows predicted beehive thymol concentration compared to measured concentration.

To simulate thymol outgassing into the bee hive, a newly-constructed DF-TE was placed into a 1.2 L bag, to measure (i) thymol that is emitted as a gas, and (ii) the viable lifetime of the dual-function entranceway. The DF-TE was placed into a 1.2 L bag that was purged, and ½-filled with $N_2$, nitrogen. At 24 hours, the gas in the bag was sampled, via 400 µl injection into the GC (FIG. 16). Each day for two months, the bag was re-purged with $N_2$, and the experiment repeated. The mass of thymol released into the 1.2 L bag each day (FIG. 17, as µg/L) was well below its equilibrium vapor pressure, allowing for scale-up of thymol vapor to fill the 4 L vacant headspace of a bee hive (FIG. 18, as µg/L). The 2-month average was compared to actual measurements from a bee hive (FIG. 15, via inserted gas entrance ports), and found to be the same (FIG. 19).

Figure 20:
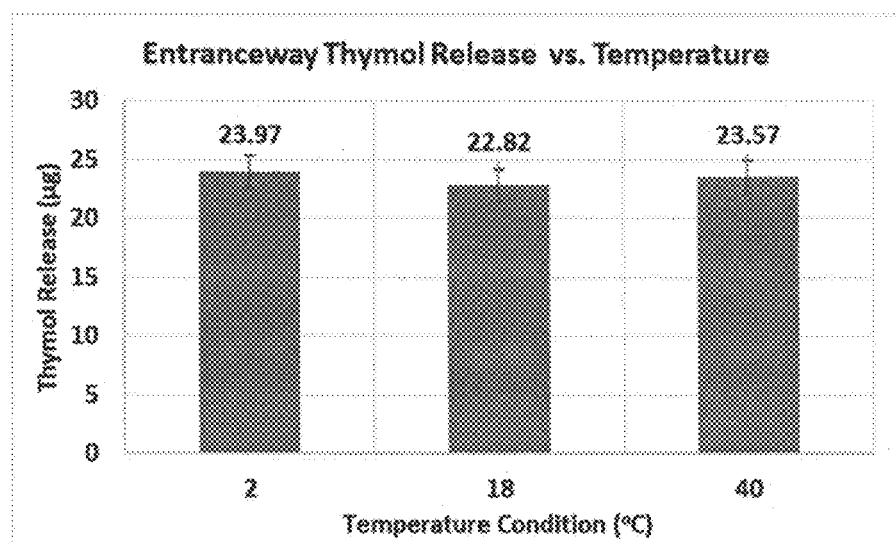
FIG. 20 shows entranceway thymol emission at 2, 20, and 45° C.
Figure 21:
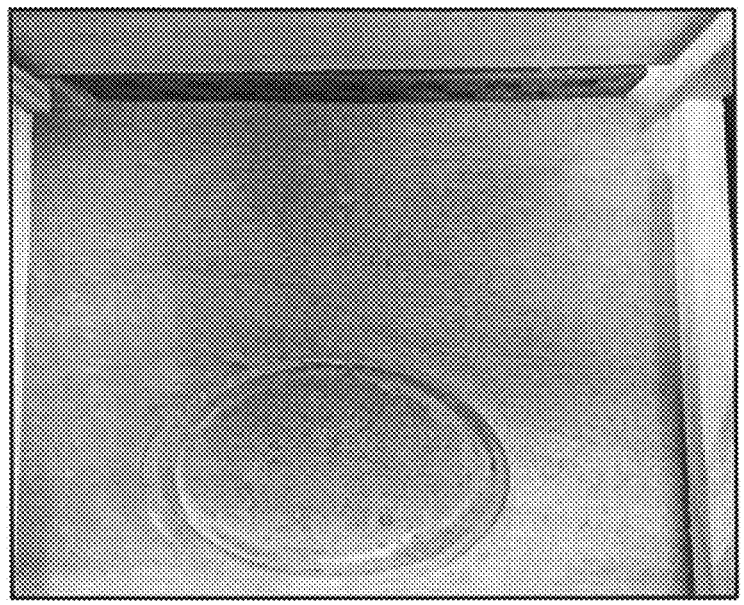
FIG. 21 shows honey placed in the hive measure to confirm no thymol contamination.

To provide evidence that DF-TE thymol gas release is independent of normal "operating" temperatures, thymol release was similarly measured in a 1.2 L bag, at 2, 20, and 40° C. (FIG. 20). Thymol release was the same, regardless of temperature. Finally, to assure that no headspace/gaseous thymol would contaminate the honey within a hive, 2.5 g of honey was dissolved in 2.5 mL of water and 100 µl of ethanol, and placed within a hive with a DF-TE (FIG. 21). GC results highlight no measurable thymol in the honey over a 2-month period.

Evaluation of Dual-Function Entranceway in a Live Setting

Figure 22A:
FIGS. 22A, FIG. 22B, and FIG. 22C show views of a beekeeper evaluating the entranceway in a beehive.
Figure 22B:
Figure 22C:
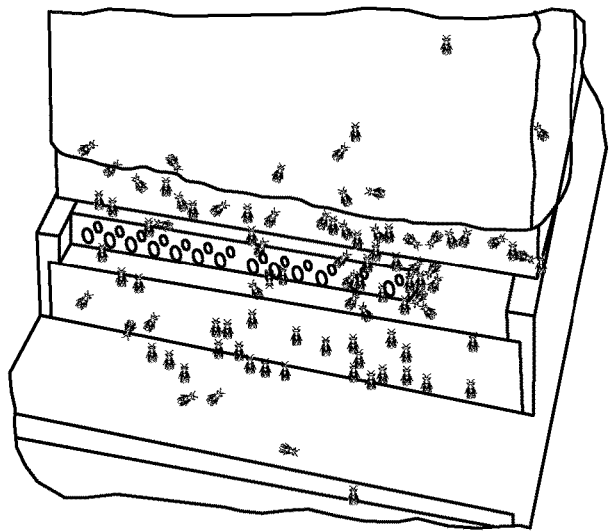

To validate that the bees would be accepting of the 50/50 concentration of thymol/Hydromed, a DF-TE was installed on a local hive (FIGS. 22A-22C). Foraging bees demonstrated indifference to the entranceway; no unusual behavior in bee activity was noted. In addition, bees that had passed through the entranceway were captured and the contact release of thymol onto their bodies was measured. Results were in agreement with results obtained in simulated experiment, with dead bees, described below.

Modeling of Honey Bee Behavior

Figure 23A:
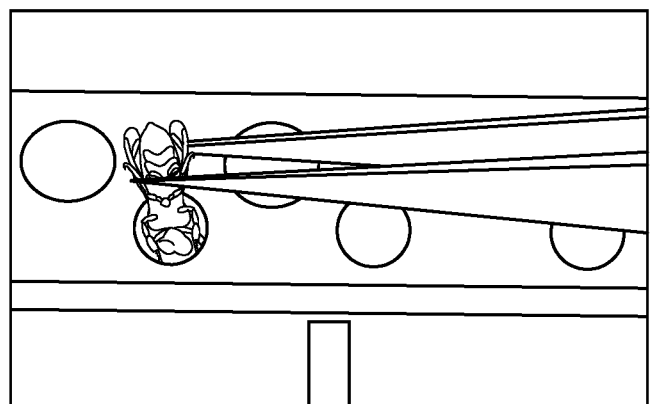
FIG. 23A shows the evaluation of the entranceway using a dead bee, showing the dead bee manually passed through a hole in the entranceway.
Figure 23B:
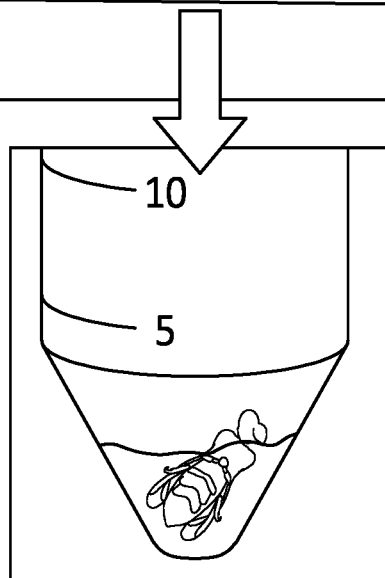
FIG. 23B shows the bee submerged in ethanol.
Figure 23C:
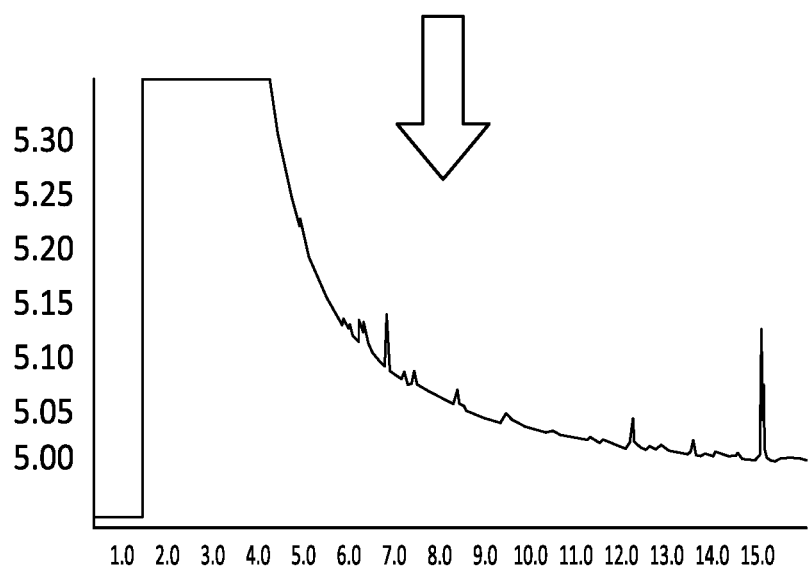
FIG. 23C shows the gas chromatogram highlighting (arrow) the presence of about 0.7 μg of thymol on the bee body.

Simulation contact-release of thymol was measured by pulling a dead bee through the entranceway hole, to simulate the movement of a live honey bee. The bee was then submerged in 300 µl of ethanol, mixed, and the thymol content measured via 3µl injection of clear filtrate into the GC (FIGS. 23A-23C).

Figure 24:
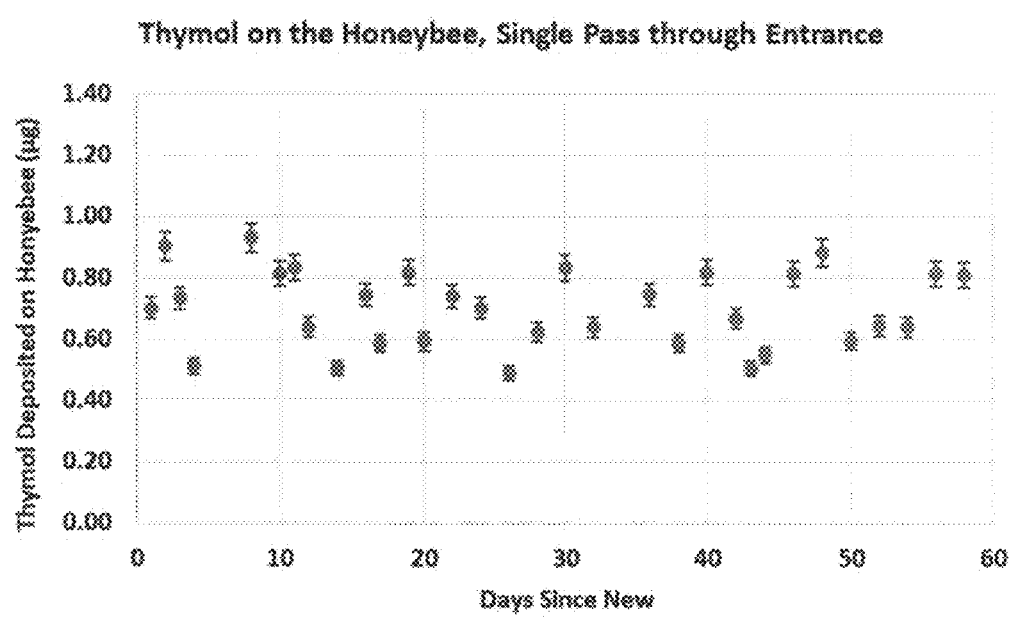
FIG. 24 shows the contact release of thymol on a passing honeybee over a period of two months with no decline in release of thymol.

Each day, a "new" dead bee was passed through a hole of the DF-TE, for up to two months. Contact release of thymol was consistent for each bee study, throughout this time (FIG. 24), with ~0.7 µg of thymol added to the bee body with a single pass through a DF-TE hole.

Modeling of Thymol Longevity on a Foraging Honey Bee

Figure 25:
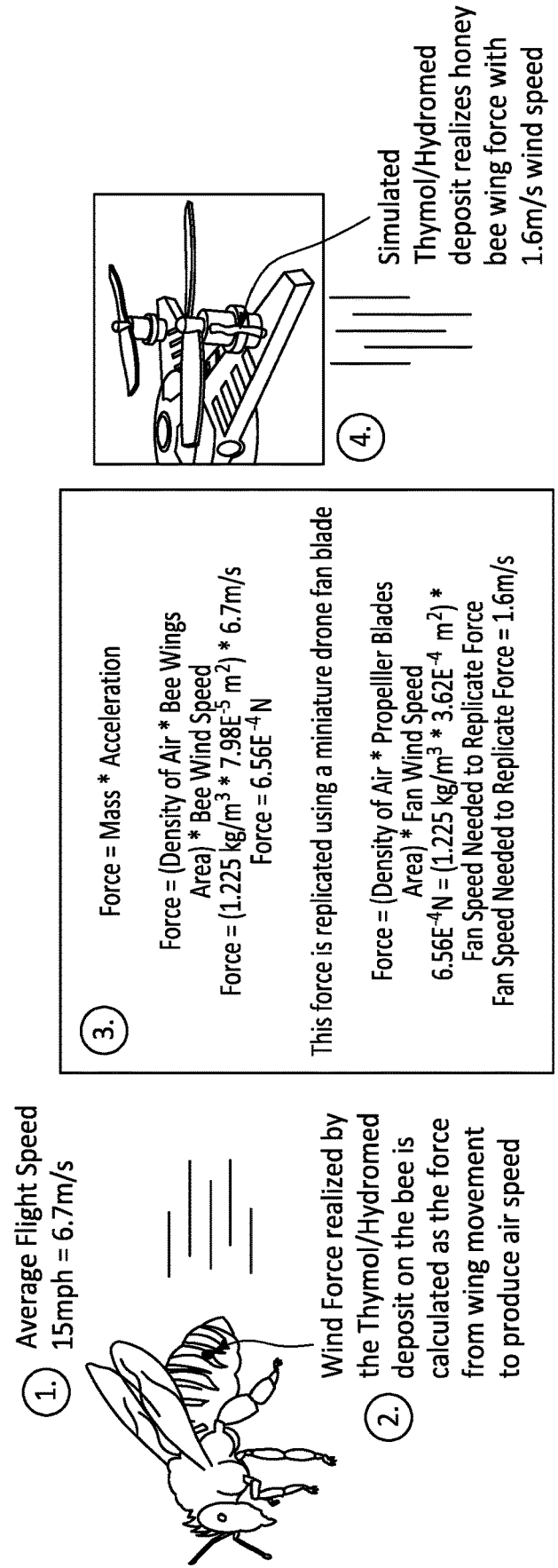
FIG. 25 shows the calculation to simulate the wing force on a bee during 6 hour per day flight to model thymol-Hydromed degradation.
Figure 26:
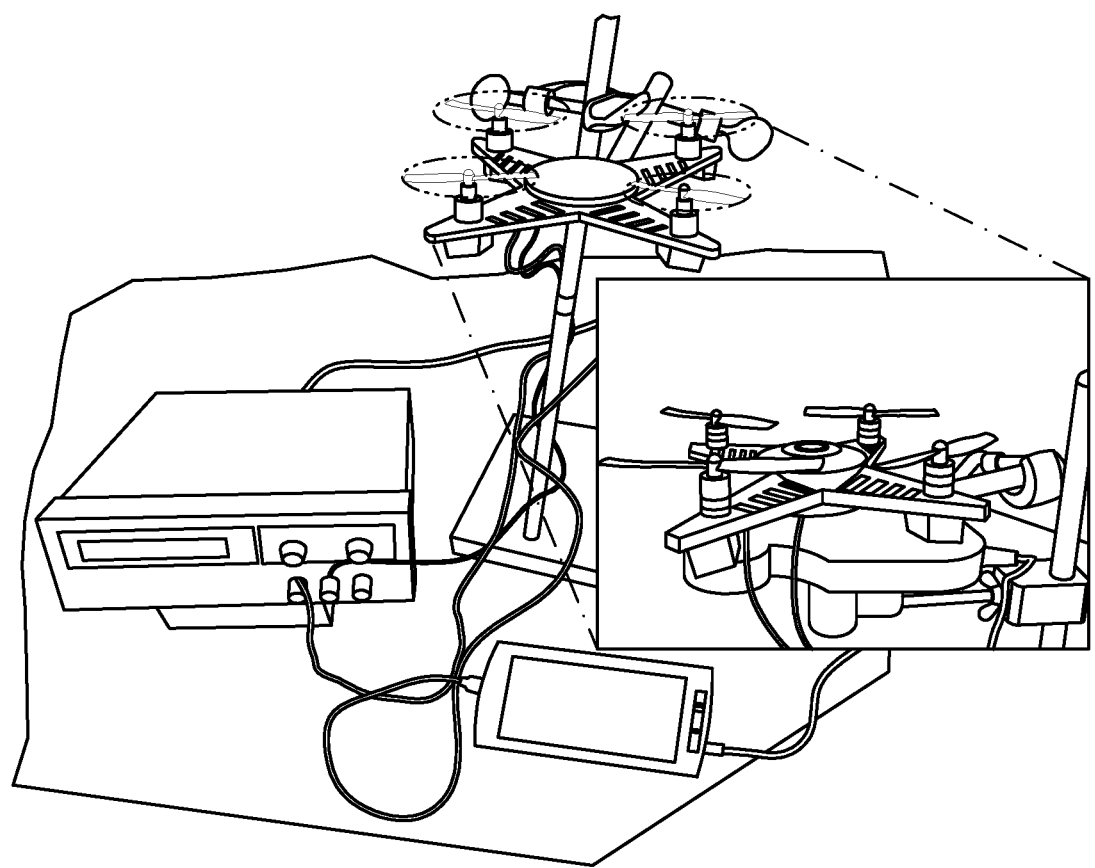
FIG. 26 shows the apparatus used to simulate the honey bee's wing force.

Under normal conditions, foraging bees leave the hive 20 times per day, for water, pollen, etc., flying ~6 hours/day. As such, a single worker bee would pass through the DF-TE 40×, receiving ~0.7 µg per passage, or 28 µg per day. The $LC_{50}$ of thymol for the *Varroa* mite is 56 ug, while that for the honey bee is 250 ug, where $LC_{50}$ is the lethal concentration, 50%, as is known. As such, it is important to understand the tendencies of thymol-in-Hydromed to degrade on the bee's abdomen during 6 hours of flight, so that the maximum thymol content, per bee, could be calculated, and maintained between 56-250 µg. The force created by a bee's wing-set, flying at 15 mph, was calculated as 6.56 $E^{-4}$ N (FIGS. 25-26), and simulated by a single drone propeller at 1.6 m/s wind speed. In the simulated-flight experiment, 1 mg of thymol/Hydromed was mounted onto a glass tube behind each of four drone propellers, which were powered for 6 hours per day. For 4 days, a separate sample was removed, soaked in 300 µl ethanol, and the thymol content measured to establish the decay rate.

Figure 27:
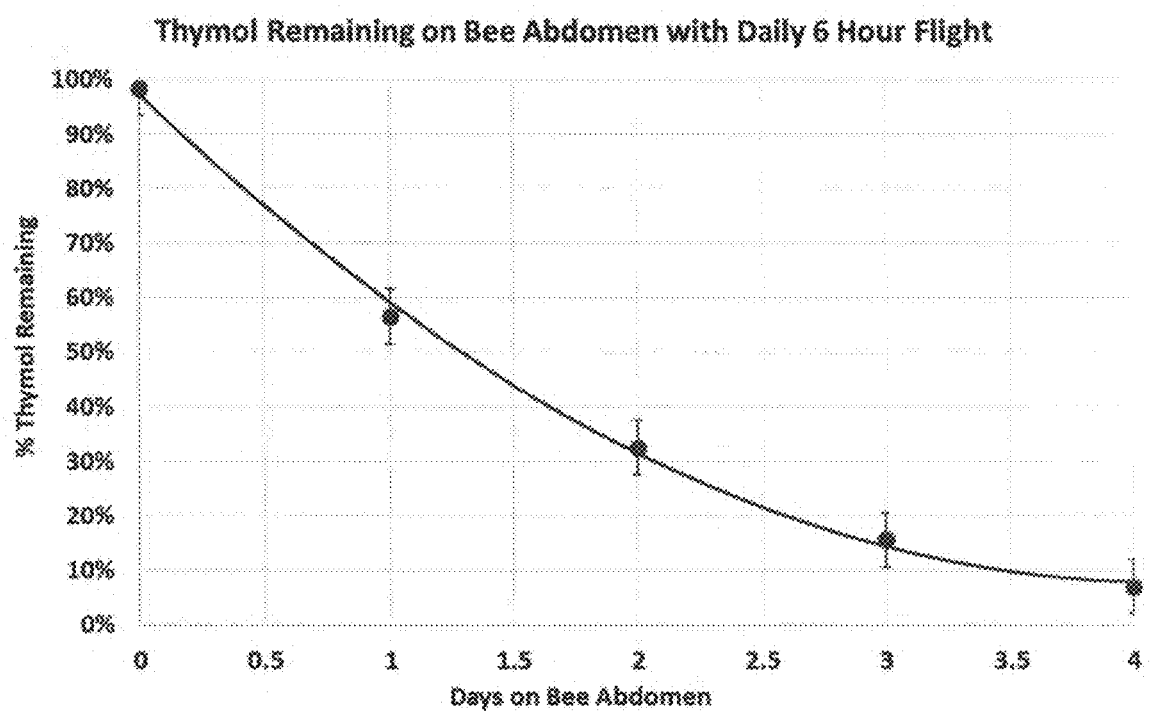
FIG. 27 shows the remaining thymol on a bee body after periods during the simulation.
Figure 28:
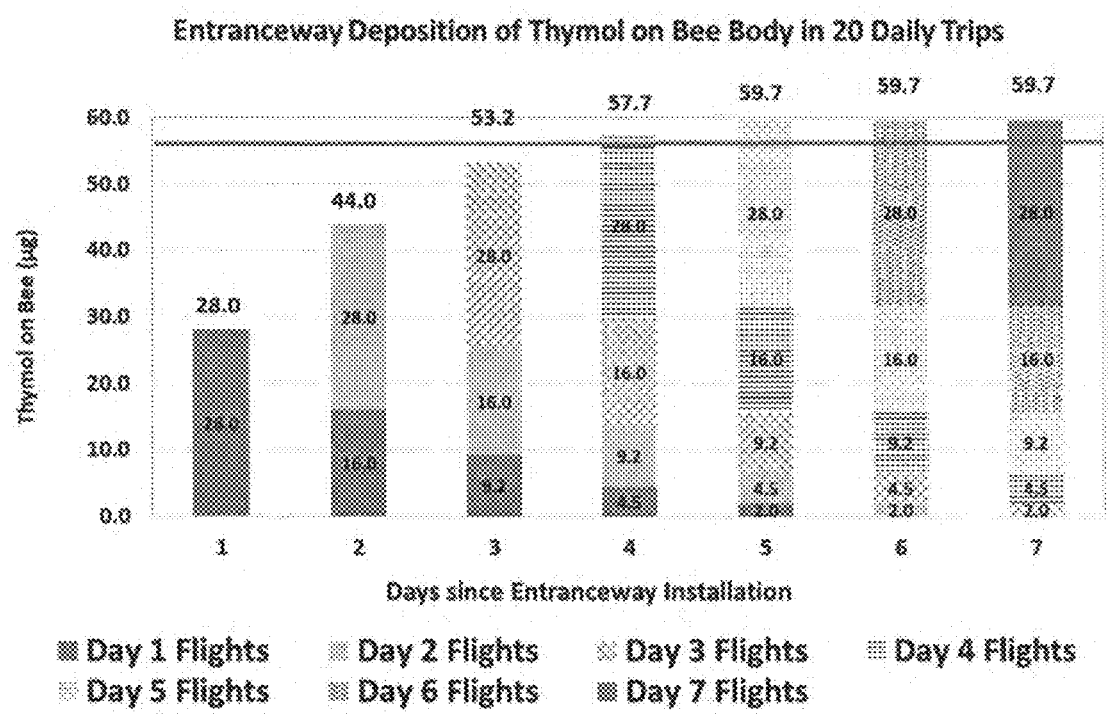
FIG. 28 shows the steady-state thymol deposition of a bee body.

Results from the 4-day simulated bee-flight study highlight exponential decay of thymol on the bee abdomen, whereby a single daily dose of thymol is exhausted within 4 days of contact (FIG. 27). A model that considers daily thymol contact dose, together with wind-induced rate of decay, can predict the thymol dosage on a worker bee, per day, from the date of the DF-TE installation (FIG. 28).

While the normal bee receives 28 µg thymol/day, that same dose decays in 4 days. Combining daily dose with daily rate of decay, it is predicted that a bee will reach maximum thymol "content" of 59.7 µg in five days after installation of the DF-TE. The thymol $LC_{50}$ for the *Varroa* mite is reached in only four days, at which point the "miticidal" action of the entranceway should take effect. Importantly, the honey bees will not be harmed, as the thymol $LC_{50}$ for bees (250 µg) is never reached, regardless of the anticipated thymol bee hive headspace content of 5.55 µg/L.

Depletion of fat bodies from the honey bee by the *Varroa* mite has been confirmed analytically via SEM and ATR-FTIR analysis. To combat this likely cause of CCD, a dual-function, thymol emitting bee hive entranceway was designed, 3D printed, and coated with 50/50 (m/m) thymol in Hydromed. Primarily, the DF-TE acts to release 0.7 µg of thymol with each passing bee contact; 28 µg is delivered to the bee each day under normal conditions. Modeling normal contact-accumulation with experimentally-simulated (drone-model) thymol decay on a bee's abdomen during 6 hours of flight/day, a maximum thymol bee delivery of 59.7 µg is reached in 5 days from installation. In only 4 days, the $LC_{50}$ for thymol/*Varroa* mite (56 µg) is reached, leading to effective miticide action. The bees will not be harmed by the DF-TE, as their $LC_{50}$ of 250 µg is never reached. Secondly, the DF-TE releases ~5.44 µg/L into a typical wooden box-hive, creating an environment that is hostile to those mites that are lodged in the hive, or on larvae. Larvae are unharmed, as their $LC_{50}$ for thymol (44 µg) is never reached in the hive headspace. Thymol gas release into the hive was found to be independent of normal operating temperatures, and did not contaminate honey within the installed hive. Finally, the DF-TE was tested on a local hive, where the bees demonstrated indifference to and acceptance of the entranceway.

To further evaluate the effectiveness of the invention, DF-TE entranceways were installed in the hives of over 100 beekeepers throughout the United States, including northern and southern California and Florida. Bees were accepting of the DF-TE entranceways in all cases. The initial mite count and weekly mite counts in the hives were measured. In a typical untreated beehive, the "alarm level" of 5.0 mites per 100 bees is reached in only 15 weeks. By contrast, beehives using the DF-TE entranceway of the invention maintained an average level of less than 0.29 mites per 100 bees. Moreover, the initial count in the hives of 0.83 mites per 100 bees was reduced by more than 70% to about 0.25 mites per 100 bees after only three weeks of entranceway use. These results demonstrate the surprising effectiveness of the entranceway.

Figure 29:
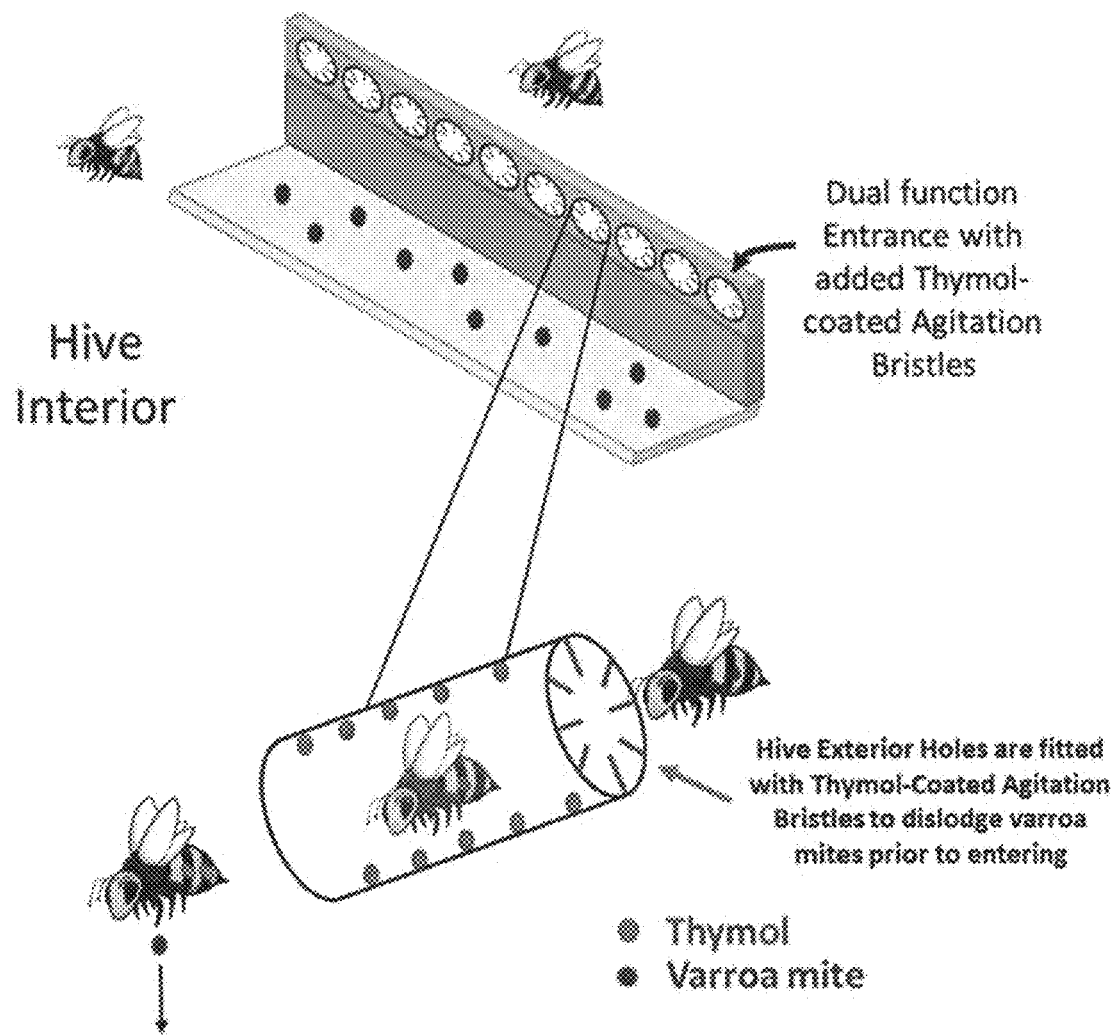
FIG. 29A shows an embodiment of the apparatus having agitation bristles in the holes of the entranceway.
FIG. 29B is a cartoon showing a bee walking through a bristle-containing hole.

In another embodiment of the invention, the entry holes of the entranceway are fitted with a plurality of agitation bristles to agitate and/or dislodge mites that might be located within the abdominal plates of the bee's exoskeleton. Although the agitation bristles are preferably coated with thymol in the same fashion as the entranceway itself, uncoated bristles may also be used if desired. The operation of the agitation bristles is illustrated in FIGS. 29A and 29B, which show a bee entering the hole of the entranceway and the agitation bristles contacting the bee to agitate, loosen or dislodge mites within the abdominal plates and promote the destruction of the mites. In some embodiments, the agitation bristles are spaced about equally around the outward-facing side of each entry hole and extend about 1.5 mm into the entranceway hole, but the extended length is not critical as long as the bristles perform their function of agitating or dislodging the mites from the bee's abdominal plates while not preventing the bee from walking through the opening. The bristles may dislodge (or partially dislodge) the mites from the bee or may agitate the mites that are burrowed into or otherwise attached to the bee causing the mite to move or adjust its position, which increases the exposure of the mite to the thymol, thereby increasing the likelihood of killing the mite. The bristles, when coated with thymol, may also provide a more consistent coating of thymol on the body of the bee to enhance mite removal/death.

Figure 30:
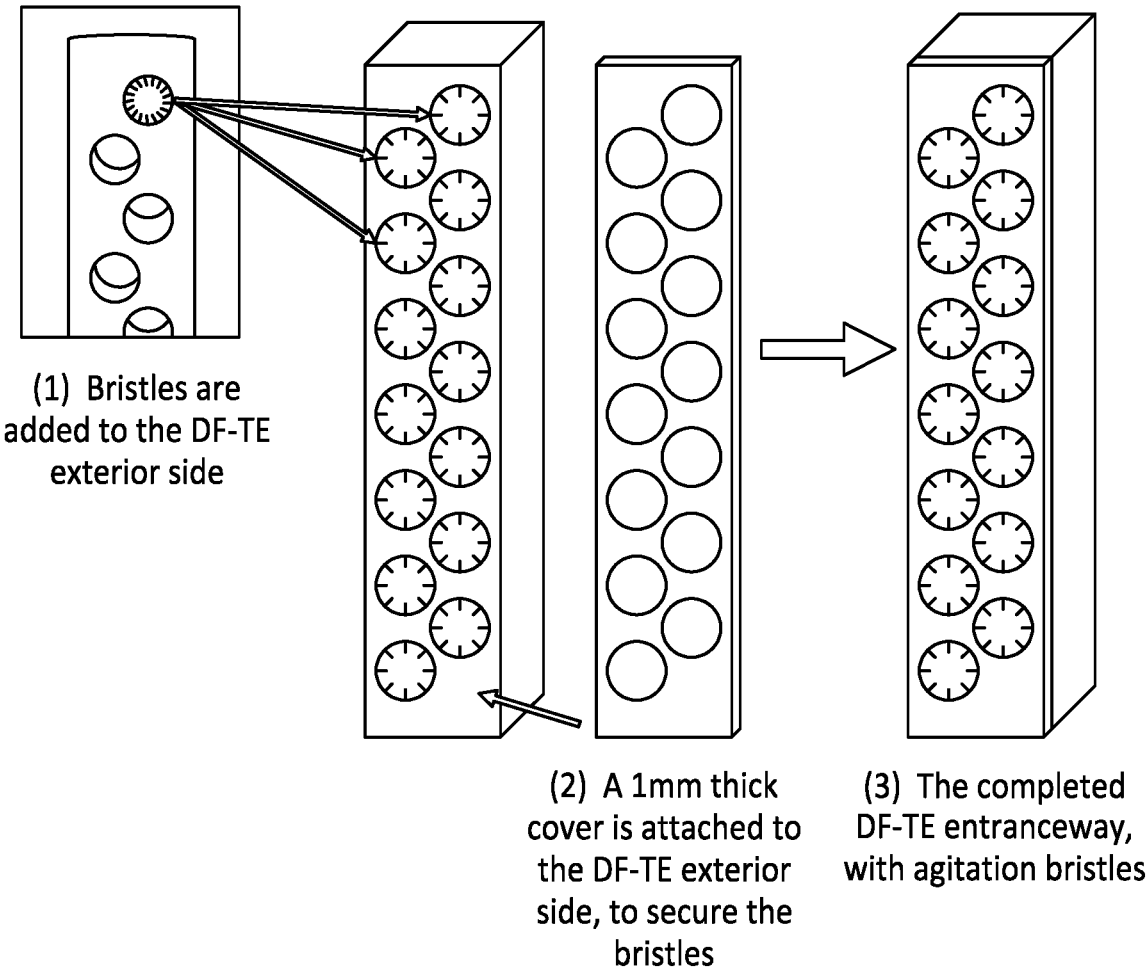
FIG. 30 shows the details of one method of constructing the embodiment of the apparatus having agitation bristles.

FIG. 30 illustrates this embodiment of the invention in more detail. The bristles may be made from the same material as the entranceway itself. Typically, a plurality of bristles (e.g., about 15 bristles) of about 3 mm in length are attached about equally spaced around the circumference of the exterior side each entrance hole so that about 1.5 mm of each bristle projects (or extends) into the hole in the plane of the exterior side. A thin cover having the same dimensions and hole placement as the exterior side of the entranceway may be placed over the exterior side to secure the bristles. The bristles may be made of known animal hair bristles, or synthetic bristles. In some embodiments, the bristles may be 3D printed as part of the 1 mm cover. In that case, the bristles may be rectangular in shape (like a tiny paddle or flap) around the circumference or perimeter of the holes and extend in the passageway by the desired bristle extension length. Other shapes, materials, spacing, and numbers of bristles and bristle extension lengths into the holes may be used if desired, provided they provide the desired function and performance discussed herein. In some embodiments, the bristles may be located at other locations along the holes, e.g., near middle of hole length, near the hive side of the hole, and/or distributed along the length of the hole, or any combination thereof. Also, in some embodiments, the shapes, materials, spacing, and numbers of bristles and bristle extension lengths into the holes may vary (or be different) along the length of the holes, provided they provide the desired function and performance discussed herein.

As was done with the embodiment of the DF-TE entranceway without the agitation bristles, simulation of contact-release of thymol was measured by pulling a dead bee through the entranceway hole, to simulate the movement of a live honey bee. The bee was then submerged in 300 µl of ethanol, mixed, and the thymol content measured via 3 µk injection of clear filtrate into the GC.

Each day, a "new" dead bee was passed through a hole of the DF-TE comprising agitation bristles, for up to two months. As with the embodiment not having bristles, the embodiment with bristles showed contact release of thymol that was consistent for each bee study, throughout this time, with ~0.7 µg of thymol added to the bee body with a single pass through a DF-TE hole. The results were substantially identical to those shown in FIG. 24 for the entranceway without bristles.

In actual use, bees tolerated the embodiment with agitation bristles as well as the embodiment without bristles and entered/exited the hive through the entranceway.

The useful life of the present DF-TE entranceway is expected to be about one month, after which time the spent entranceway may be removed and replaced by a fresh one. Unlike current commercial varroacidal treatments, replacement of the entranceway is simple and does not require opening the hive or otherwise disturbing the bees.

This present invention has been exemplified by various embodiments described herein. However, the scope of the invention is not to be limited to these specific embodiments but is defined only by the appended claims.

What is claimed is:

1. An entranceway for a beehive comprising a solid substrate, said substrate dimensioned to completely occlude an entrance of the beehive and comprising a plurality of entry holes dimensioned to allow entry of bees into the beehive only when walking, and said substrate being coated with a thymol-containing composition, whereby bees entering the beehive are compelled to pass through the entry holes and contact the thymol-containing composition, wherein the thymol-containing composition is a mixture consisting essentially of thymol and an ether-based hydrophilic urethane.

2. The entranceway of claim 1 wherein the solid substrate is a 3-dimensional (3D) printer compatible polymer.

3. The entranceway of claim 2 wherein the solid substrate comprises acrylonitrile butadiene styrene (ABS).

4. The entranceway of claim 1 wherein the thymol-containing composition is a mixture consisting of thymol and the ether-based hydrophilic urethane.

5. The entranceway of claim 1 which further comprises a plurality of agitation bristles spaced about each of the entry holes, extending into each of the entry holes, and dimensioned to contact the entering bees and agitate or dislodge *Varroa* mites under the abdominal plates of the bees.

6. The entranceway of claim 5 wherein the agitation bristles are coated with thymol.

7. A method of combatting *Varroa* infestation in a beehive which comprises providing the entranceway of claim 1 to the beehive so that bees are obligated to walk through the holes to enter the bee hive.

8. The method of claim 7 which comprises providing the entranceway of claim 4.

9. The method of claim 7 further comprising outgassing the thymol from the entranceway to a headspace of the beehive.

10. A beehive comprising a removable entranceway, the entranceway comprising a solid substrate having a plurality of holes for restricting bees from flying into the beehive, the entranceway comprising a coating of a thymol-containing composition, whereby bees entering the beehive are compelled to walk through the holes and contact the thymol-containing composition, wherein the thymol-containing composition is a mixture consisting essentially of thymol and an ether-based hydrophilic urethane.

11. The beehive of claim 10 wherein the solid substrate is a 3D printer compatible polymer.

12. The beehive of claim 11 wherein the solid substrate comprises ABS.

13. The beehive of claim 10 wherein the thymol-containing composition is a mixture consisting of thymol and the ether-based hydrophilic urethane.

* * * * *